[11] 3,854,325
[45] Dec. 17, 1974

Coate

[54] METHOD AND MEANS FOR DETERMINING FATIGUE DAMAGE AND SURFACE STRESS

[75] Inventor: Forrest M. Coate, Hawthorne, Calif.

[73] Assignee: The United States of America as represented by the Secretary of the Air Force, Washington, D.C.

[22] Filed: July 13, 1973

[21] Appl. No.: 379,029

[52] U.S. Cl. ............................. 73/67.6, 73/88 A
[51] Int. Cl. .................................. G01n 29/04
[58] Field of Search ............... 73/67.5 R, 67.6, 71.3, 73/88 A, 67.3

[56] References Cited
UNITED STATES PATENTS
3,471,238  10/1969  Hawke .................. 73/71.3 UX
3,745,812  7/1973   Korpel .................. 73/67.5 R OTHER PUBLICATIONS
R. L. Whitman et al., Probing of Acoustic Surface Perturbations by Coherent Light, Applied Optics, Aug. 1969, pp. 1567-1576.

Primary Examiner—Richard C. Queisser
Assistant Examiner—John P. Beauchamp
Attorney, Agent, or Firm—Harry A. Herbert, Jr.; Henry S. Miller

[57] ABSTRACT

The test specimen is mounted on a movable table, ultrasonic surface waves are caused to travel across the specimen by a transducer fed from a CW signal source, a laser beam is passed through a beam splitter, one portion being reflected onto a photo-detector measuring signal amplitude, an output signal is compared with the output of the CW signal and the CW signal shifted in phase by 90°, these outputs measure ultrasonic phase difference, at points along the specimen; the second portion of laser beam is reflected from a mirror attached to the specimen table and back to a screen where an interference pattern is formed as the table is moved, photo detectors sense the changes in interference pattern and determine specimen displacement.

5 Claims, 1 Drawing Figure

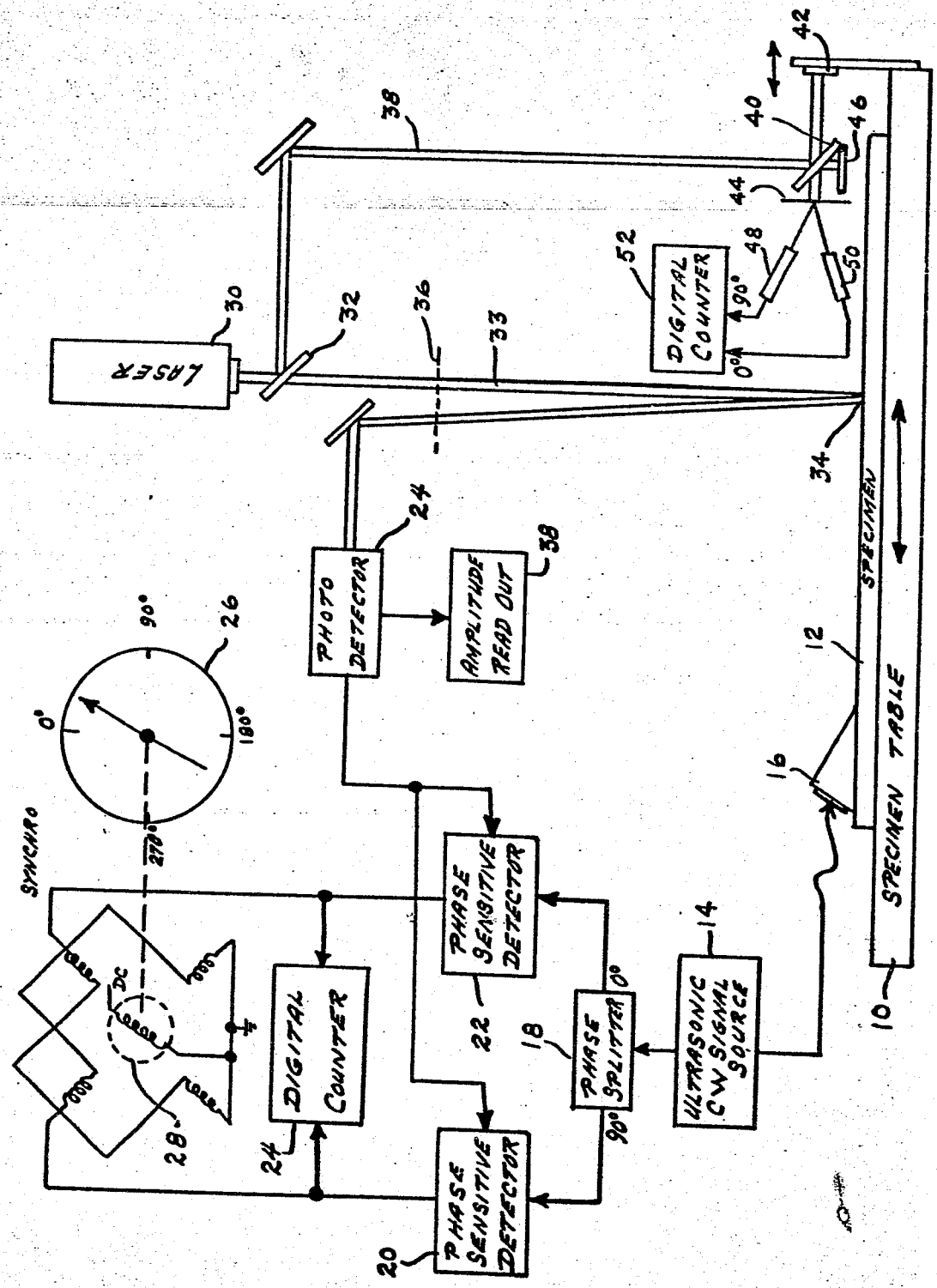

METHOD AND MEANS FOR DETERMINING FATIGUE DAMAGE AND SURFACE STRESS

BACKGROUND OF THE INVENTION

This invention relates generally to a method and means for determining early fatigue damage and surface stress in metals and more particularly to such a determination through the precise measurement of ultrasonic surface wave velocity.

With the increased utilization of exotic metals and the increased use of common metals to their maximum capability in aircraft, space flight paraphernalia and undersea exploration, the need for the early determination of fatigue damage and surface stress becomes more urgent than in the past.

Early fatigue damage appears first at the surface of the metal and can best be detected ultrasonically by using the highest practical surface wave frequency which travels in very close proximity to the metal surface. In order to detect early damage, where the signs are not readily apparent, the velocity and attenuation rate must be measured with extreme accuracy if they are to reveal these very small changes associated with the early stages of fatigue damage.

Known methods and means for detecting early damage have proven less than satisfactory. Known devices are cumbersome, introduce stress or deformation into the specimen, by weight or contact pressure from measuring equipment, and, in general, fail to provide the extreme accuracy needed to detect signs of metal fatigue.

SUMMARY OF THE INVENTION

The invention measures three parameters in order to successfully utilize ultrasonic waves in detecting early damage in metals. The amplitude of the ultrasonic surface wave is measured at selected locations on the surface of a test specimen. Displacement is measured very accurately as the specimen is moved laterally between test positions. As the specimen travels from one position to another, the phase shift or phase slip, between the detected signal and the ultrasonic frequency source, is measured within a small fraction of a cycle.

The attenuation rate can be determined by knowing the amplitudes of the surface wave at two points a known distance apart along the path of the signal. Similarly wavelength can be calculated by knowing the phase relationship of the ultrasonic signals at the two points. Velocity is simply the product of wavelength and frequency.

The invention places a test specimen on a movable test stand or table. Ultrasonic waves are emitted across the surface by a surface wave transponder fed from a CW ultrasonic signal source. A lower beam directed toward the surface is passed through a beam splitter where part of the beam is reflected from the surface to a photo-detector. The remainder of the beam is reflected through a mirror system to provide an interference pattern on a screen which detects movement of the table or test stand. The portion of the beam reflected from the surface is sent to a photo detector where signal amplitude is measured and the output is compared with the original CW signal and the original signal phase shifted by 90°. The phase shift is detected and recorded and provides an indication of the surface quality of the metal.

It is therefore an object of the invention to provide a new and improved method and means for determining fatigue damage and surface stress in metals.

It is another object of the invention to provide a new and improved method of inspecting metal surfaces that is more accurate than any hitherto known.

It is a further object of the invention to provide a new and improved means for testing metals that is more efficient than similar devices of the prior art.

It is still another object of the invention to provide a new and improved test means that may be easily operated.

It is still a further object of the invention to provide a new and improved test means for metals that requires no physical connection between the measuring system and the tested metal.

It is another object of the invention to provide a new and improved means for inspecting metal surfaces that will not introduce stress or deformation errors into the tested metal.

It is another object of the invention to provide a new and improved method of testing metal surfaces that is fast, accurate and more reliable than any hitherto known.

It is another object of the invention to provide means for determining fatigue damage and surface stress which is economical to produce and utilizes conventional, currently available components that lend themselves to standard mass production manufacuturing techniques.

These and other advantages, features and objects of the invention will become more apparent from the following description taken in connection with the illustrative embodiment in the accompanying drawings.

DESCRIPTION OF THE DRAWING

The FIGURE is a schematic representation of the invention.

DESCRIPTION OF THE PREFERRED EMBODIMENT

The invention relates to the precise measurement of three parameters whereby fatigue damage and surface stress in metals may be detected using ultrasonic methods. These three parameters include signal amplitude, specimen displacement and ultrasonic phase difference.

Referring now to the FIGURE, the invention consists of a longitudinal movable specimen Table 10 with appropriate means for mounting a specimen 12. An ultrasonic CW signal source 14 is connected to a surface wave transducer 16 positioned on the specimen 12. Connected to the said source is a phase splitter 18 for shifting the phase of the CW signal source by 90°. Phase sensitive detectors 20 and 22 compare the phase of the signals from the phase splitter 18 with the signal from the photo detector 24. The output of the detectors is sent to the digital couter 24 which indicates full wavelengths with digital accuracy while partial wavelengths are indicated by the dial 26 attached to the shaft of two phase synchro receiver 28.

The measuring system consists of a laser 30 radiating through the beam splitting mirror 32 to the test specimen 12 at a point 34. The initial laser beam 33 passes through the grating 36 as does the reflected beam on its way to the detector 24. A means for providing an amplitude readout from the photo detector is shown at 38 and will be discussed hereinafter.

The remainder of the laser beam 38 is reflected through another beam splitting device 40 where one portion of the beam is reflected from a mirror 42 attached to the table 10 and back to a screen 44. The remainder of the beam is reflected from a stationary mirror 46 to the screen 44.

A pair of photosensors 48 and 50 sense the pattern on the screen 44 and send a signal to the counter 52 where table movement is measured.

The operation of the invention follows thusly; ultrasonic surface wave amplitude is measured by the angular displacement of the reflected laser beam as the surface waves pass through the test point. In the FIGURE, the laser beam travels first through a half silvered mirror or beam splitter 32 which diverts part of the light for use in the specimen displacement measuring system. The remaining light passes through an optical grating 36 composed of alternate clear and opaque line pairs spaced approximately at the expected wavelength of the ultrasonic surface wave. The frequency of the surface wave may be varied to achieve this result if necessary.

Light from the laser source 30, after passing through the grating 36, travels to the specimen in parallel slices similar to sunlight through a venitian blind. As the surface waves travel across the specimen, the slices or ribbons of light will strike each of the waves at the same relative position. At one instant the light will strike the crest of each wave within the area of the laser beam diameter and the angle of reflection will be equal to the angle of incidence to the plane of the specimen. As the wave progresses a quarter wavelength the light will strike the downward slope of each wave and will be reflected at a small angle to the left as seen in the FIGURE.

When the wave has moved another quarter wavelength the trough will reflect the light at the same angle as the crest. At the third quarter wavelength position, the reflection will be to the right as seen in the FIGURE. The grating 36 is positioned in a manner so that approximately half of each reflected plane or slice of light will pass through the clear bands, then the energy striking the photodetector will be approximately proportional to the angle of reflection for small angles. This light energy will be modulated sinusoidally at the frequency of the ultrasonic surface wave, with an amplitude proportional to the amplitude of the surface wave displacement. An AC voltmeter or oscilloscope (38) may be used to compare amplitudes at various test points on the specimen and thus provide an indication of attenutation.

Displacement or travel of the specimen table between test locations is measured with an interferometer system. A portion of the laser light (38) is diverted to a mirror system where it is divided and follows two paths. The reference beam passes downward through a beam splitter 40, is reflected by the lower mirror 46 and is reflected from the beam splitter mirror to a screen 44.

The variable path beam is reflected from the surface of the beam splitter and strikes a mirror 42 attached to the specimen table 10. The length of this path changes when the table is moved, however the light returns to pass through the beam splitter 40 to strike the screen 44. The two beams create an interference pattern on the screen 44. If the screen is at a very slight angle or the light beams are not precisely parallel, interference fringes will appear on the screen. The fringe pattern will move one complete fringe width on the screen for each displacement of the table equal to a half wavelength of the light.

Photodetectors 48 and 50 are used to detect the light travel at two locations on the fringe pattern that are approximately 90° out of phase. This two phase information is fed to a digital indicator capable of sensing the direction of motion. The digital indicator will indicate displacement of the specimen table relative to an initial position within one half wavelength of the laser light.

Phase difference between the ultrasonic signals at two test points on a specimen is determined by measuring the phase shift or phase slip relative to the ultrasonic frequency source while moving the detector system from one test point to another. The method of measuring this phase change is similar to that used in the interferometer but is accomplished by different means.

The signal from the continuous wave ultrasonic signal source 14 is fed to both the surface wave transducer 16 and to the electrical phase splitter 18. The phase splitter produces two reference signals differing in phase by ninety degrees. The transducer creates a train of surface waves which travel across the specimen, past the test point illuminated by the laser beam 33. The photo detector 24, used for amplitude measurements also provides phase information to both of the phase sensitive detectors 20 and 22. Because the reference phases are in quadrature, the outputs of the detectors are also in quadrature. As the path length of the surface wave between transducer and test point changes one wavelength, the two phase signal to the phase shift digital indicator 24 rotates through one complete cycle. The indicator displays full wavelengths with digital accuracy. Partial wavelengths are indicated by the dial 26, attached to the shift of a two phase synchro receiver 28.

It should be understood, of course, that the foregoing disclosure relates to only a preferred embodiment of the invention and that numerous modifications or alterations may be made therein without departing from the spirit and scope of the invention set forth in the appended claims.

I claim:

1. A method for determining early fatigue damage and surface stress in metals comprising the steps of: transmitting an ultrasonic wave across a surface to be examined; directing a beam of coherent radiation at a point on the said surface, through the ultrasonic wave; detecting the reflected coherent radiation; moving the surface in a known manner; measuring the change in amplitude of the reflected radiation, and comparing the phase relationship of the reflected radiation to the ultrasonic wave whereby variations in said amplitude and phase will be indicative of fatigue damage and surface stress.

2. A system for detecting fatigue damage and surface stress in metals comprising: means for supporting a test specimen; means attached to the support means for measuring displacement of the test specimen in a plane; means for generating an ultrasonic wave; means connected to the generating means for transmitting the ultrasonic wave along a surface of the test specimen; a source of coherent radiation; means for transmitting said radiation from the source to the surface; means for measuring the radiation reflected from the surface of the test specimen; display means connected to said measuring means to indicate the amplitude of said reflected radiation; phase detecting means connected to said generating means and said measuring means to detect changes in phase of said ultrasonic wave and said reflected radiation, and display means for providing an indication of said phase changes.

3. A system for detecting fatigue damage and surface stress in metals according to claim 2 wherein the means to indicate amplitude is an oscilloscope.

4. A system for detecting fatigue damage and surface stress in metals according to claim 2 wherein the display means for indicating phase changes is a digital counter.

5. A system for detecting fatigue damage and surface stress in metals according to claim 2 wherein the means for transmitting the ultrasonic wave is a surface wave transducer.

* * * * *